US008203910B2

(12) United States Patent
Zhao et al.

(10) Patent No.: US 8,203,910 B2
(45) Date of Patent: Jun. 19, 2012

(54) AUTONOMOUS ULTRASONIC INDOOR LOCATION SYSTEM, APPARATUS AND METHOD

(75) Inventors: Junhui Zhao, Beijing (CN); Yongcai Wang, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 313 days.

(21) Appl. No.: 12/473,858

(22) Filed: May 28, 2009

(65) Prior Publication Data

US 2009/0295639 A1  Dec. 3, 2009

(30) Foreign Application Priority Data

May 29, 2008  (CN) .......................... 2008 1 0111009

(51) Int. Cl.
*G01S 3/80* (2006.01)
(52) U.S. Cl. ........................................ 367/127; 367/128
(58) Field of Classification Search .................. 367/127, 367/128
See application file for complete search history.

(56) References Cited

U.S. PATENT DOCUMENTS

| | | | | |
|---|---|---|---|---|
| 3,973,241 | A * | 8/1976 | Streckenbach et al. ........ | 367/199 |
| 4,967,400 | A * | 10/1990 | Woods ............................. | 367/21 |
| 6,141,293 | A * | 10/2000 | Amorai-Moriya et al. ... | 367/127 |
| 7,362,655 | B1 * | 4/2008 | Hester ............................ | 367/127 |
| 2001/0035866 | A1 * | 11/2001 | Finger et al. .................. | 345/568 |
| 2005/0137748 | A1 * | 6/2005 | Kim ............................... | 700/245 |
| 2005/0232081 | A1 * | 10/2005 | Holm ............................. | 367/118 |
| 2006/0002231 | A1 * | 1/2006 | Chamberlain .................. | 367/78 |
| 2006/0013070 | A1 * | 1/2006 | Holm et al. .................... | 367/128 |
| 2006/0077759 | A1 * | 4/2006 | Holm ............................. | 367/128 |
| 2006/0215494 | A1 * | 9/2006 | Thomas ......................... | 367/128 |
| 2006/0291332 | A1 * | 12/2006 | Szajnowski .................... | 367/127 |
| 2007/0070812 | A1 * | 3/2007 | Lee ................................ | 367/128 |
| 2007/0091722 | A1 * | 4/2007 | Karlsen .......................... | 367/76 |
| 2007/0159924 | A1 * | 7/2007 | Vook et al. .................... | 367/127 |
| 2008/0049555 | A1 * | 2/2008 | Holm et al. .................... | 367/99 |

(Continued)

FOREIGN PATENT DOCUMENTS

JP   59-17392 B2   4/1984

(Continued)

OTHER PUBLICATIONS

Walworth, M.; Mahajan, A.; , "3D position sensing using the difference in the time-of-flights from a wave source to various receivers," Advanced Robotics, 1997. ICAR '97. Proceedings., 8th International Conference on , pp. 611-616, Jul. 7-9, 1997.*

(Continued)

*Primary Examiner* — Thomas Tarcza
*Assistant Examiner* — James Hulka
(74) *Attorney, Agent, or Firm* — Sughrue Mion, PLLC

(57) ABSTRACT

An autonomous ultrasonic indoor location system includes a location beacon transmitting apparatus and a location beacon receiving apparatus. The location beacon transmitting apparatus is configured to sequentially transmit US signals at a predetermined time interval upon transmission of a signal containing synchronization information. The location beacon receiving apparatus is configured to synchronize with the location transmitting apparatus when synchronization information is detected, determine transmission order of the received US signals based on the obtained synchronization timing, infer transmission timings of the respective US signals based on the determined transmission order, calculate TOA information corresponding to each of the received US signal from the transmission timings and reception timings of the respective US signals, and determine location of the location beacon receiving apparatus on basis of the positions of the US transmitters in the transmitting apparatus and the calculated TOA information sequence.

22 Claims, 13 Drawing Sheets

U.S. PATENT DOCUMENTS

2008/0084789 A1* 4/2008 Altman ................. 367/127

FOREIGN PATENT DOCUMENTS

| JP | 59-166185 U | 11/1984 |
| JP | 63-266377 A | 11/1988 |
| JP | 2002-267740 A | 9/2002 |
| JP | 2005-500731 A | 1/2005 |
| JP | 2005-69892 A | 3/2005 |
| JP | 2005-114722 A | 4/2005 |
| JP | 2007-93313 A | 4/2007 |

OTHER PUBLICATIONS

Gaetano Borriello, Alan Liu, Tony Offer, Christopher Palistrant, and Richard Sharp. 2005. "WALRUS: wireless acoustic location with room-level resolution using ultrasound." In Proceedings of the 3rd international conference on Mobile systems, applications, and services (MobiSys '05). ACM, New York, NY, USA, 191-203.*

Villadangos, J.M.; Urena, J.; Mazo, M.; Hernandez, A.; Alvarez, F.; Garcia, J.J.; De Marziani, C.; Alonso, D.; , "Iimprovement of ultrasonic beacon-based local position system using multi-access techniques," Intelligent Signal Processing, 2005 IEEE International Workshop on, pp. 352-357, 1-1 Sep. 2005.*

El Moutia, A.; Makki, K.; , "Time and Power Based Positioning Scheme for Indoor Location Aware Services," Consumer Communications and Networking Conference, 2008. CCNC 2008. 5th IEEE, pp. 868-872, Jan. 10-12, 2008.*

Office Action dated Aug. 24, 2011 from the Japanese Patent Office in counterpart Japanese application No. 2009-128669.

Japanese Office Action dated Feb. 13, 2012 issued in Japanese Application No. 2009128669.

* cited by examiner (a)

(b)

(c)

AUTONOMOUS ULTRASONIC INDOOR LOCATION SYSTEM, APPARATUS AND METHOD

TECHNICAL FIELD

The technical field of the present invention relates to indoor location and position sensing, and in particular, to an ultrasonic based indoor location system, apparatus and method that performs position calculation at client side and lets the objects know their own physical position.

BACKGROUND

Undoubtedly, location information is a fundamental content to be utilized to extract the geographical relationship between the users and the environments so as to further understand the user behaviors. The importance Is and promise of location-aware applications has led to the design and implementation of systems for providing location information, particularly in indoor and urban environments. Currently, there is an increasing market need for high-accuracy tracking of people and assets in real time in many different application scenarios including office, healthcare, coalmine, subway, smart building, restaurant etc. For instance, in office environment, employees are required to access confidential information database in certain secure zone. Out of the zone, any access will be prohibited. The examples of the secure zone can be a single room, part of a working area, and even a table.

The well-known Global Positioning System (GPS) can provide the object's location information at the accuracy of several ten meters outdoors, however, in indoor environment GPS does not work well since the positioning result of GPS is degraded dynamically by multipath effect and signal obstruction.

Conceptually, indoor location system can be categorized into tracking system and navigating system. In tracking system, position calculation runs at server side so as to locate the object's position for tracking. In this case, a database kept track of the locations of all the entities, thereby the user privacy may not be guaranteed. Further, in a tracking system, all control and management functions are centralized at the server side so that it is not possible to deploy and administer a system in a scalable way.

For example, in U.S. Pat. No. 6,216,087 to R. Want entitled "Infrared Beacon Position System", a proximity based location system "Active badge" is build over bidirectional infrared link where one infrared beacon is deployed in each room and the mobile unit is a small, lightweight infrared transceiver that broadcast an unique ID every a fixed interval. Since infrared signals can hardly penetrate walls, ID broadcasts are easily contained within an office, providing high-accuracy localization at room granularity.

In "Bat" system of U.S. Pat. No. 6,493,649 to Jones entitled "Detection system for determining positional and other information about objects", users wear small badges which emit an ultrasonic pulse when radio-triggered by a central system. The system determines pulse TOA (Time of Arrival) from the badges to dense receiver array installed on the ceiling, and calculates the 3D positions of the badges based on a multi-lateration algorithm.

"Sonitor" system of International Patent Publication No. WO 03/087871 A1 to S. Holm entitled "A system and method for position determination of objects" provides an ultrasonic-only indoor positioning system to achieve room-granularity location accuracy. Sonitor's tags transmit 20 kHz to 40 kHz ultrasonic signals to receivers located in the listening area. Through frequency modulation, each tag communicates a unique signal to the receivers, use algorithms to read the signals and then forward their ID to a central server.

On the other hand, navigating system aims to perform position calculation at client side and let the objects know their own physical locations. User applications do not advertise their locations unless they want to be discovered by others. By this means, user privacy concern can be adequately met.

In a non-patent document "RADAR: An In-Building RF-based User Location and Tracking System, P. Bahl etc., Proc. IEEE INFOCOM, 2000", a location system based on strength of received signals in 802.11 wireless network is presented. The basic RADAR location method is performed in two phases. Firstly, in an off-line phase, the system is calibrated and a model is constructed with strengths of received signals at a finite number of locations distributed about the target area. Secondly, during on-line operation in the target area, mobile units report the signal strengths received from each base station and the system determines the best match between the on-line observations and any point in the on-line model. The location of the best matching point is reported as the location estimate. However, RF (radio-frequency) systems, which use signal strength to estimate location can not yield satisfactory results because RF propagation within buildings deviates heavily from empirical mathematical models.

Additionally, in a non-patent document "The Cricket Location-Support System, B. Nissanka, etc., Proceedings of the Sixth International Conference on Mobile Computing and Networking, Boston, Mass., USA, August 2000", a "Cricket" system is presented. As shown in FIG. 1, the Cricket system consists of a set of independent, unconnected Ultrasonic Location Beacon (ULB) transmitters installed in a building. Each ULB transmitter contains both RF transmitter and US (ultrasonic) transmitter. During working, each RF transmitter will emit RF signal if it hears a clean RF channel, and simultaneously the US transmitter will emit ultrasonic signal. A receiver that is carried on an object will firstly receive the RF signal for synchronization with each ULB transmitter, then receive the ultrasonic signal so that it can measure the distance between the transmitter and itself using Time of Arrival (TOA), and then infer its own physical position for navigating when the object receives more than 3 TOA samples. However, there are disadvantages of Cricket system: 1) multiple RF transmission and multiple US transmission are employed in Cricket system so as to make the coordination rather complex and to increase the system cost; 2) since the RF transmitters are randomly selected such that only one ULB transmitter may emit RF and US signal at a time, the RF emission from all ULB transmitters are unordered; and 3) an Object hears only one ultrasonic beacon at a time, and may move between chirps from different beacons. As a result, there is no guaranteed simultaneity in the distance samples, which can lead to inaccurate position estimation.

SUMMARY OF THE INVENTION

In order to solve the above problems, it is an object of the present invention to provide an indoor location system that is user-privacy preserving, decentralized, high accuracy and low-cost for practical application scenarios. An autonomous ultrasonic indoor location system includes a location beacon transmitting apparatus and a location beacon receiving apparatus. The location beacon transmitting apparatus is configured to sequentially transmit US signals at a predetermined time interval upon transmission of a signal containing synchronization information. The location beacon receiving apparatus is configured to synchronize with the location transmitting apparatus when synchronization information is detected, determine transmission order of the received US signals based on the obtained synchronization timing, infer transmission timings of the respective US signals based on the determined transmission order, calculate TOA information corresponding to each of the received US signal from the transmission timings and reception timings of the respective US signals, and determine location of the location beacon receiving apparatus on basis of the positions of the US transmitters in the transmitting apparatus and the calculated TOA information sequence.

An aspect of the invention provides a location-beacon transmitting apparatus comprising a first-signal transmitter for transmitting a first-signal containing synchronization information; a plurality of second-signal transmitters; and a second-signal transmission controlling means for controlling the plurality of second-signal transmitters to sequentially transmit second-signals in a predetermined order at a predetermined time-interval upon transmission of the first-signal. The first-signal transmitter may transmit the first-signal periodically to allow the plurality of second-signal transmitters to sequentially transmit the second-signals in a circular manner. The first-signal may be a RF signal, a microwave signal or an infrared signal. The second-signal may be an ultrasonic signal.

Another aspect of the invention provides a location-beacon receiving apparatus for receiving a location-beacon from a transmitting apparatus, comprising a first-signal receiver for receiving a first-signal containing synchronization information; a second-signal receiver for sequentially receiving second-signals; a synchronizing unit for synchronizing with the transmitting apparatus utilizing the synchronization information contained in the first-signal and obtaining a synchronization timing; an order identification unit for identifying a transmission order for the respective second-signals received by the second-signal receiver based on the synchronization timing; a TOA acquisition unit for acquiring a TOA information sequence corresponding to the respective second-signals based on the transmission order of the respective second-signals identified by the order identification unit; and a position calculation unit for calculating the position of the receiving apparatus based on the positions of the transmitting sources of the respective second-signals received by the second-signal receiver and the TOA information sequence acquired by the TOA acquiring unit.

In a feature, the order identification unit comprises a transmission ordinal determination part which divides a time period that begins from the transmission timing of the first second-signal transmitting source into n intervals at the transmission time-interval and determines that the transmission ordinal number of a received second-signal is i if the reception timing of the second-signal is in the ith interval, where n is the number of the second-signal transmitting sources and i=1, 2, . . . , n; and a second-signal transmission timing inferring part for inferring a transmission timing for each of the received second-signals based on the transmission ordinal numbers determined by the transmission ordinal number determination part.

In another feature, a time period from when the first-signal receiver receives the first first-signal to when the first-signal receiver receives the second first-signal is an emission period, wherein the position calculation unit comprises a consecutive triangulation part for applying a three-length sliding window along the TOA information sequence acquired by the TOA acquisition unit and calculating in real time the position of the receiving apparatus based on three temporal-neighboring TOA information samples in an emission period and the positions of the transmitting sources of the respective second-signals by triangulation, thereby obtaining a series of position information of the receiving apparatus in the emission period; and a consecutive median filter part for removing any outlier from the series of position information to obtain a plurality of real-time positions of the receiving apparatus in the emission period.

Still another aspect of the invention provides a method for transmitting a location-beacon comprising the steps of transmitting a first-signal containing synchronization information; and transmitting sequentially second-signals at a predetermined time-interval upon transmission of the first-signal.

Yet another aspect of the invention provides a method for receiving a location beacon in a receiving apparatus from a transmitting apparatus, comprising the steps of receiving a first-signal containing synchronization information, synchronizing with the transmitting apparatus by utilizing the synchronization information, and obtaining a synchronization timing; sequentially receiving second-signals; identifying transmission order for the respective second-signals based on the synchronization timing; acquiring a TOA information sequence corresponding to the respective second-signal based on the identified transmission order; and calculating the position of the receiving apparatus based on the positions of the transmitting sources of the respective second-signals and the acquired TOA information sequence.

As compared with the prior art, the autonomous ultrasonic indoor location system presented in the present invention brings the advantages of low system complexity, user-privacy preserving, high location accuracy and real-time.

The indoor location system of the invention provides a simple mechanism for transmitting location beacons and is capable of coordinating transmission of synchronization information and transmission of US signals for position calculation in a simplified way.

The indoor location system of the present invention performs position calculation at the receiver side without the necessity to provide a central server for control and maintenance, and is readily scalable in practical application scenarios.

BRIEF DESCRIPTION OF THE DRAWINGS

FIG. 4 is a schematic diagram illustrating a structural US polling (sequential transmission) mechanism of an ultrasonic location beacon (ULB) transmitting apparatus in accordance with an embodiment of the present invention, wherein FIG. 4(a) is a schematic diagram showing structure of the ULB transmitting apparatus 200 in accordance with the embodiment by taking a hexagonal star topology as an example, and FIG. 4(b) is a block diagram showing the structural US sequential transmission mechanism of the ULB transmitting apparatus 200 in accordance with the embodiment;

DETAILED DESCRIPTION OF THE INVENTION

Figure 1:
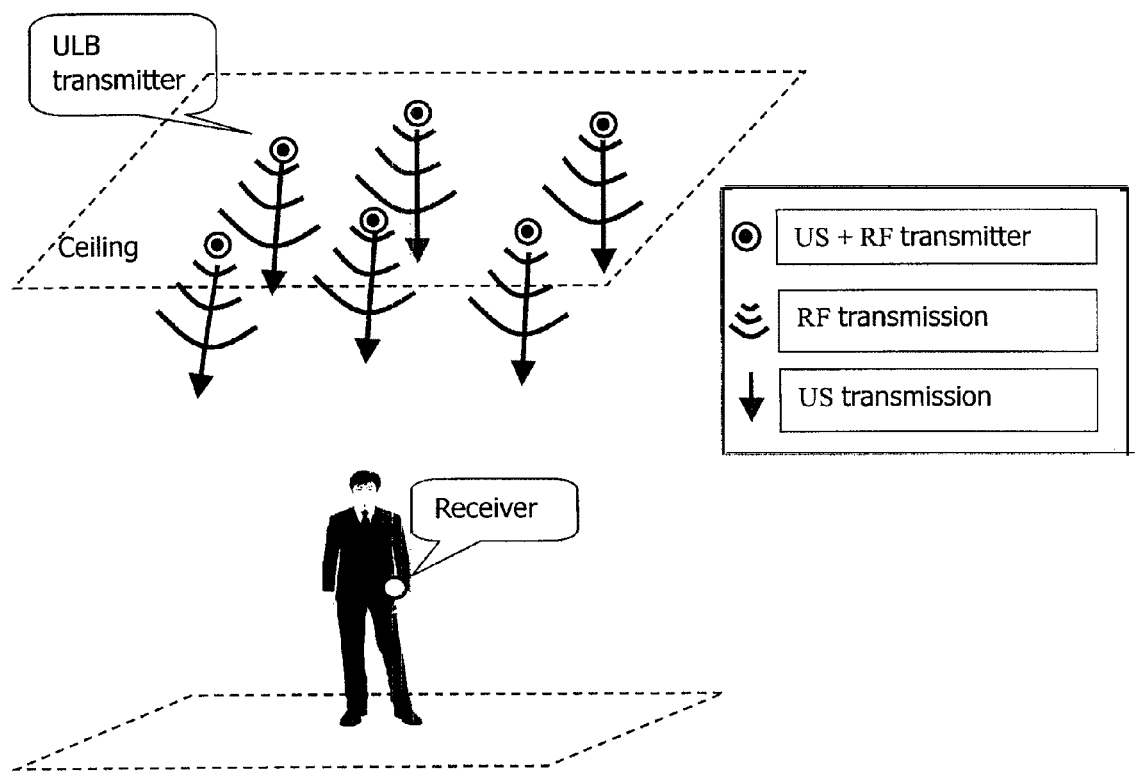
FIG. 1 is a schematic diagram illustrating an ultrasonic location system of prior art.

Embodiments of the present invention will be described below with reference to the accompanying drawings. In the description herein, numerous specific details are provided, such as examples of components and/or methods, to help fully understanding of the present invention. However, it will be appreciated by those skilled in the art that embodiments of the present invention may be implemented without one or more of these specific details or with other apparatus, system, assembly, method, component, material, element, etc. In other instances, well known structure, material or operation have not been depicted or described in detail in order not to obscure aspects of the embodiments of the present invention. In this specification and drawings, like reference numerals represent structural elements with substantially the same functions, and repeated description of them will be omitted.

<Overview of the System>

Figure 2:
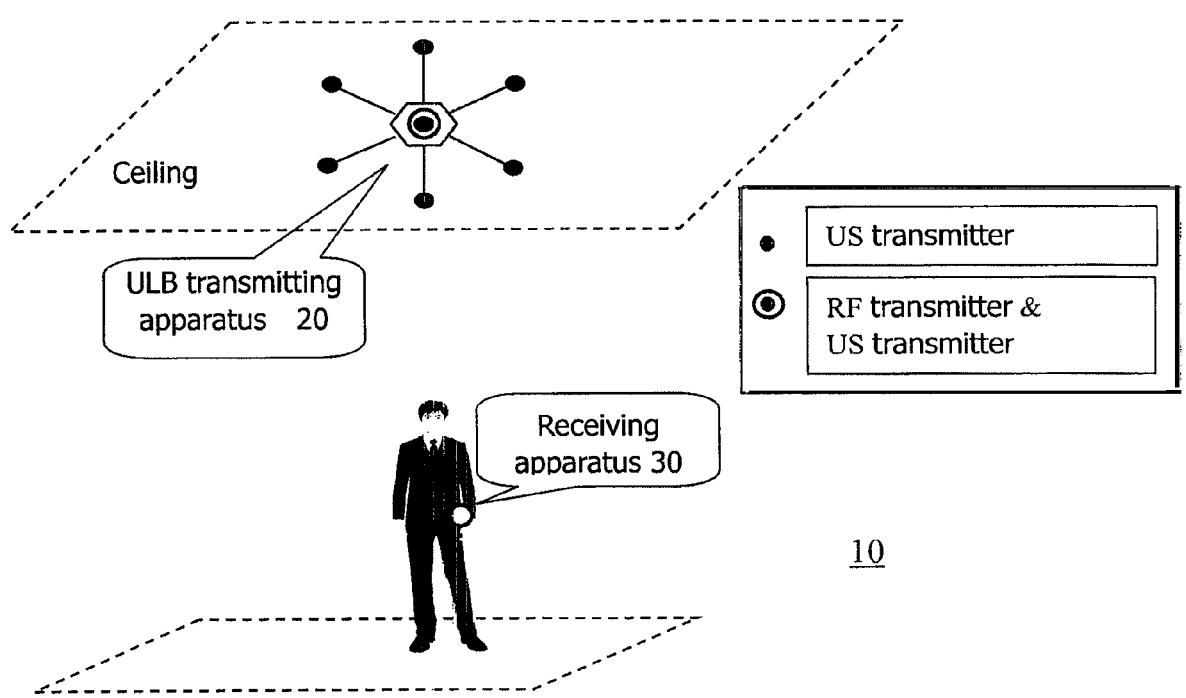
FIG. 2 is a schematic diagram depicting an ultrasonic location system in accordance with an embodiment of the present invention.

Firstly, overview of an ultrasonic based location system according to an embodiment of the present invention will be described. FIG. 2 is a schematic diagram depicting an ultrasonic (US) location system according to an embodiment.

As shown in FIG. 2, the US location system 10 according to the embodiment comprises an ultrasonic location beacon (ULB) transmitting apparatus 20 installed on the ceiling which transmits a location beacon and a ULB receiving apparatus 30 carried on an object which receives the location beacon and calculates the position of itself from the received location beacon. ULB transmitting apparatus 20 includes in turn a single RF transmitter and a structural US transmitter including a plurality of US transmitters. The RF transmitter transmits a RF signal (e.g., data packet) containing synchronization information based on a predetermined transmission timing signal, and the plurality of US transmitters, after transmission of the RF signal containing synchronization information by the RF transmitter, sequentially transmit ultrasonic sound at a predetermined time interval. Herein, the term "location beacon" refers to the signal containing synchronization information transmitted by the RF transmitter and the US signal sequence transmitted by the structural US transmitter.

The position relationship between the plurality of US transmitters included in the structural US transmitter is fixed, that is to say, the number of the US transmitters included in the structural US transmitter is determinate, the distances therebetween could be determined, and US signals are sequentially transmitted at a predetermined order. Please note that as used herein, the US transmitter may be for example a low cost, narrow band US transmitter which operates at a single frequency (e.g., 40 KHz), and which when triggered, transmitting only US pulses containing no information.

The ULB receiving apparatus 30, upon start-up, begins to detect the synchronization information transmitted from the ULB transmitting apparatus 20, synchronizes with the ULB transmitting apparatus 20 using the detected synchronization information, then sequentially detects the US sequence transmitted from the ULB transmitting apparatus 20 and calculates its own position using the detected US sequence.

In this embodiment, by way of example, the RF transmitter is used as a device for transmitting synchronization information. However, the present invention is not limited to this specific example. In other embodiments, devices such as microwave transmitter and infrared transmitter may be used for transmitting the signal containing the synchronization information.

Additionally, in this embodiment, the location beacon includes a US signal sequence. Alternatively, in addition to the US sequence, the location beacon may include a sound wave sequence, an infrasonic wave sequence or other mechanical wave sequence that travels more slowly than electromagnetic wave.

The structural US transmitter according to the embodiment shown in FIG. 2 is illustrated to include seven US transmitters and have the structure of regular hexagon. However, the present invention is not so limited. The number of the US transmitters may be increased or decreased as required, and any type of structure may be employed depending upon application scenario. Further, the receiving apparatus 30 in FIG. 2 is shown to be carried on a person. However, the present invention is of course not so limited. Instead, the receiving apparatus 30 may be installed on any object that needs to be located or navigated.

<Location Beacon Transmitting Apparatus>

Detailed configuration of a location beacon transmitting apparatus according to the present invention will be described below. The location beacon transmitting apparatus of the present invention comprises a first-signal transmitter and a plurality of second-signal transmitters. The first-signal is for example a RF signal, a microwave signal, an infrared signal or the like; and the second-signal is for example a sound wave signal, an infrasonic signal or other mechanical wave that travels more slowly than a electromagnetic wave.

Figure 3:
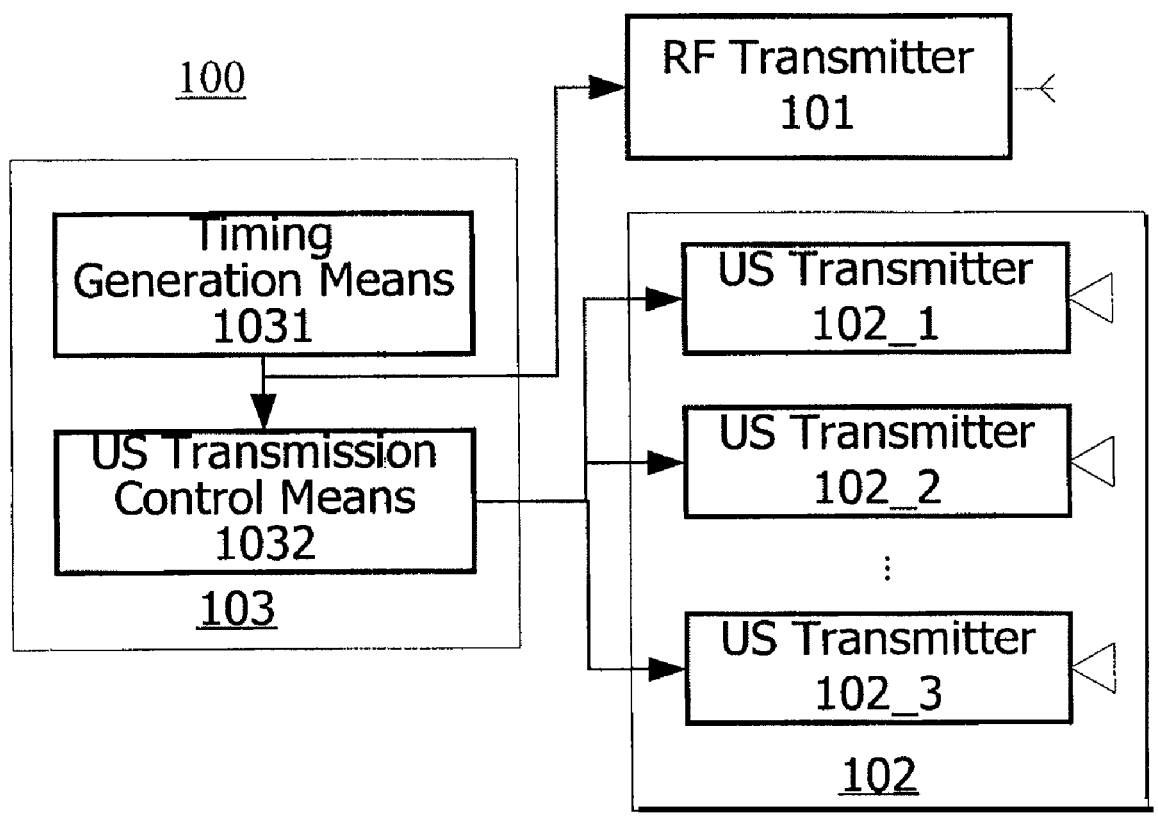
FIG. 3 is a block diagram illustrating the detailed configuration of an ultrasonic location beacon transmitting apparatus in accordance with an embodiment of the present invention.

By taking the RF transmitter and the US transmitter as an example, the location beacon transmitting apparatus according to the present invention will now be described. FIG. 3 is a block diagram illustrating detailed configuration of an ultrasonic location beacon (ULB) transmitting apparatus 100 according to an embodiment of the present invention.

As shown in FIG. 3, the ULB transmitting apparatus 100 according to the embodiment comprises a RF transmitter 101 for transmitting a RF signal (e.g., RF packets) containing synchronization information; a structural US transmitter 102 including multiple US transmitters 102_1-102_n (where n is a natural number) which sequentially transmit ultrasonic signals at predetermined time intervals; and a transmission timing controller 103 for controlling transmission timings of the RF transmitter 101 and the structural US transmitter 102.

In an example, the RF transmitter 101 may further transmit the following additional information: transmitter-position determination information for the structural US transmitter 102, information on transmission time interval of the US transmitters 102_1-102_n, and/or a backoff time. Depending upon different application scenarios, the transmitter-position determination information may be structural information of the US transmitters or position information directly indicating location of each US transmitter by coordinates or the like. The structural information of the US transmitters is for example number of the US transmitters, distances between the US transmitters, topology of the structural US transmitter, etc. The structural information may be used at receiver side to calculate location of each US transmitter. The backoff time is a time delay for coordinating transmission timings, between the RF transmitter 101 and the structural US transmitter. The additional information and the synchronization information may be for example packaged into a RF packet for simultaneous transmission or be separately transmitted.

The transmission timing controller 103 shown in FIG. 3 includes a timing generation means 1031 and a US transmission controlling means 1032. The timing generation means 1031 generates RF transmission timing signals at a predetermined period, and outputs the generated RF transmission timing signals to the US transmission controlling means 1032 and the RF transmitter 101. The RF transmitter 101 transmits RF signals based on the RE transmission timing signals received from the timing generation means 1031. The US transmission controlling means 1032 generates a US transmission timing signal sequence $T_{polling,1}$-$T_{polling,n}$ at a predetermined interval based on the RF transmission timing signals received from the timing generation means 1031, and sends the US transmission timing signal sequence to the structural US transmitter 102 by wire or wireless. Specifically, upon reception of a RF transmission timing signal generated by the timing generation means 1031, US transmission controlling means 1032 generates a first US transmission timing signal $T_{polling,1}$ and sends the same to the US transmitter 102_1; after a predetermined time interval $T_{interval}$, the US transmission controlling means 1032 generates a second US transmission timing signal $T_{polling,2}$ and sends the same to the US transmitter 102_2; ... the US transmission controlling means 1032 generates a last US transmission timing signal $T_{polling,n}$ and sends the same to the US transmitter 102_n. As a response to reception of the US transmission timing signal intended to it, the plurality of US transmitters 102_1-102_n sequentially transmits US signals. By this means, the plurality of US transmitters achieve sequential transmission of US signals at a predetermined interval and in a certain order. Thus far, the transmission timing controller 103 completes a polling (sequential transmission) control period, and the structural US transmitter 102 completes a polling period.

<Structural US Sequential Transmission Mechanism>

Figure 4:
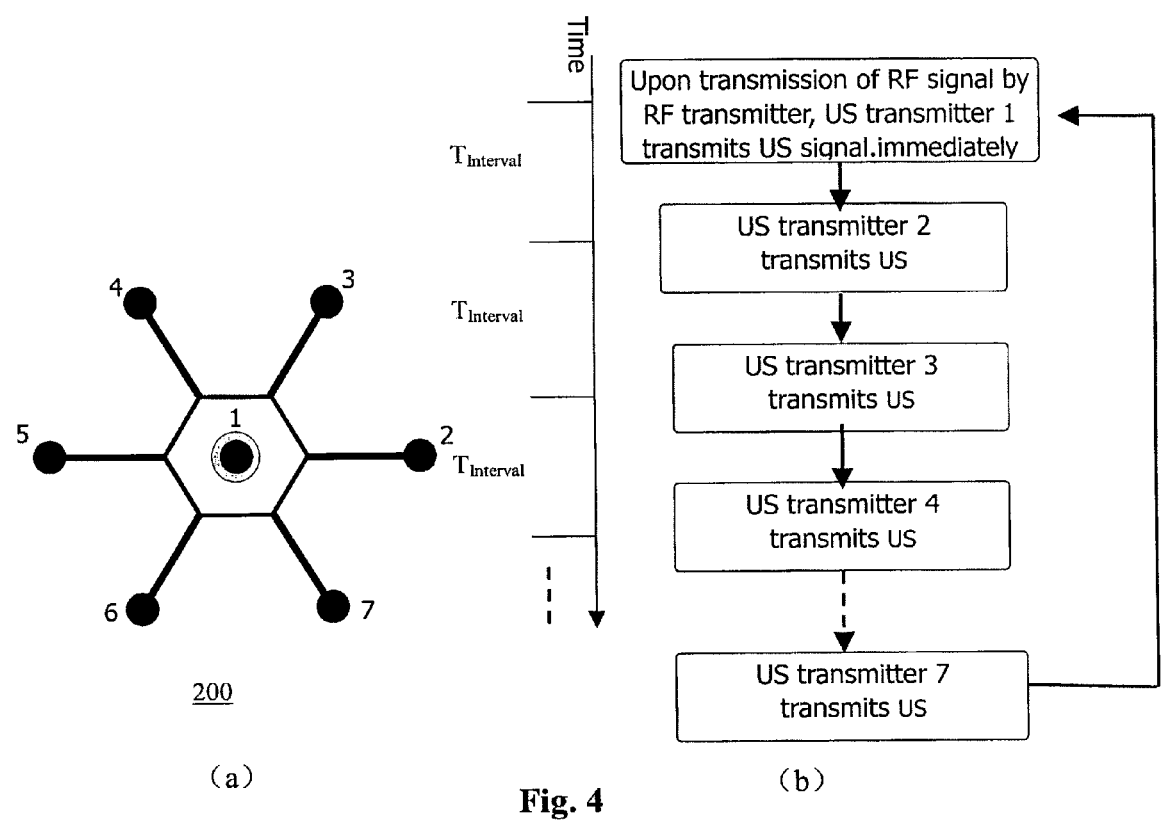

Next, with reference to FIG. 4, description will be given to a structural US sequential transmission mechanism of a ULB transmitting apparatus 200 according to an embodiment of the present invention. FIG. 4 is a schematic diagram illustrating the structural US sequential transmission mechanism according to the embodiment, in which FIG. 4(a) is a schematic diagram showing a structure of the ULB transmitting apparatus 200 according to the embodiment by taking a hexagonal star topology as an example, and FIG. 4(b) is a block diagram showing the structural US sequential transmission mechanism of the ULB transmitting apparatus 200 according to the embodiment.

As shown in FIG. 4(a), the ULB transmitting apparatus 200 of the embodiment includes a RF transmitter and seven US transmitters with the US transmitter located at the center along with the RF transmitter numbered 1 and the surrounding US transmitters numbered 2 to 7 in a predefined manner (herein, in anticlockwise order). Herein, the ordinal numbers of the US transmitters illustratively indicate transmission order of each US transmitter.

As shown in FIG. 4(b), once the RF transmitter transmits a RF signal containing synchronization information, the US transmitters sequentially transmit US signals in an order of transmitter 1, transmitter 2, . . . , transmitter 7, for example. After the last US transmitter completes US transmission, the process will return and wait for another RF transmission by the RF transmitter so as to start a next US sequential transmission period. The time interval between two adjacent US transmitters is fixed to be $T_{interval}$ so that the transmission timing of each US transmitter is accurately defined. Herein, the RF transmission period of the RF transmitter is defined as a polling period. In the case of disregarding the backoff time (i.e., a time delay of the transmission timing of the first US transmitter relative to the transmission timing of the RF transmitter), the US transmitter numbered 1 is configured to transmit the first US signal in synchronization with the RF signal transmission by the RF transmitter. In this case, the polling period may be represented as follows:

$$T_{PollingPeriod}=(n-1)\cdot T_{interval} \qquad (1)$$

<Selection of Transmission Time Interval of the Structural US Transmitter>

Figure 5:
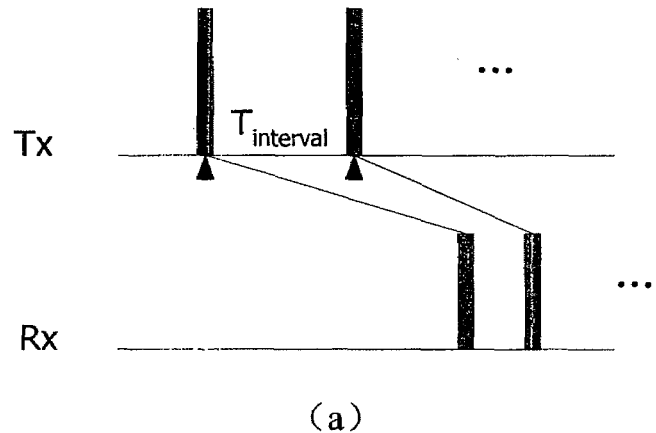
FIG. 5 is a schematic diagram illustrating three reception cases where transmission time interval is erroneously selected in accordance with an embodiment of the present invention.
Figure 5:
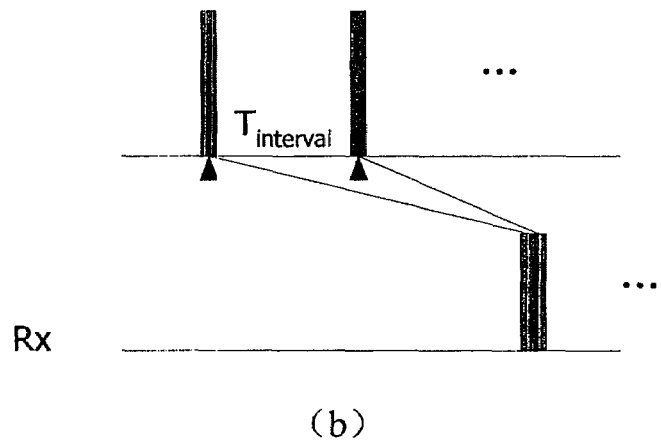
Figure 5:
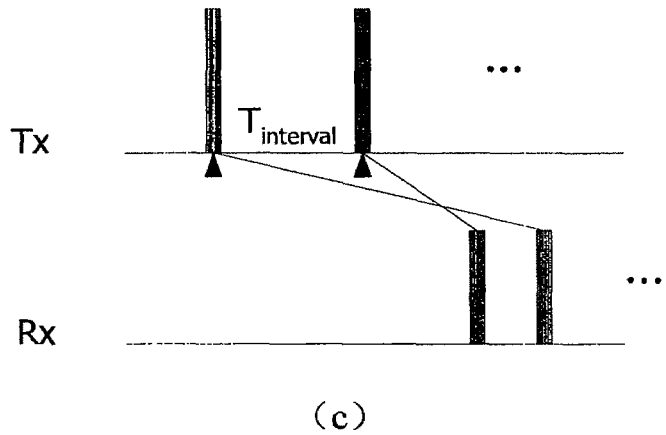
Figure 6:
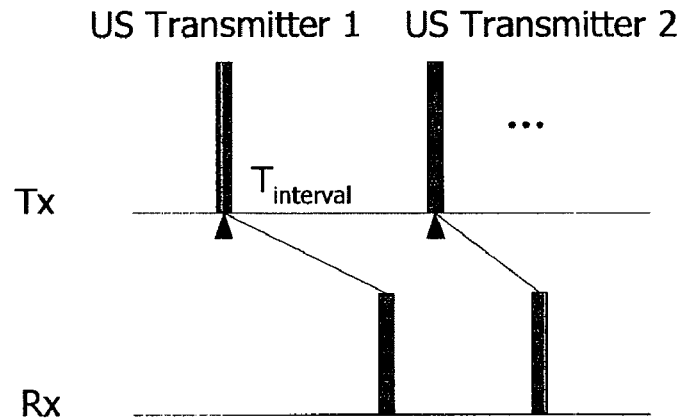
FIG. 6 is schematic diagram illustrating a reception case where transmission time interval is correctly selected in accordance with an embodiment of the present invention.

Hereinafter, selection of transmission time interval $T_{interval}$ of the structural US transmitter according to the present invention will be described with reference to FIGS. 5 and 6. FIG. 5 is a schematic diagram illustrating three reception cases where transmission time interval $T_{interval}$ is erroneously selected; and FIG. 6 is schematic diagram illustrating a reception case where transmission time interval $T_{interval}$ is correctly selected.

As shown in FIG. 5, US transmitter 1 and US transmitter 2 send US signals at a fixed time interval. Since the ULB receiving apparatus is close to US transmitter 2 and is relatively far away from US transmitter 1, the propagation time from US transmitter 1 to the ULB receiving apparatus will be longer than that from US transmitter 2 to the ULB receiving apparatus. Thus there are three possible cases of US arriving at the receiver side: (a) the ULB receiving apparatus receives two US pulses after US transmitter 2 emits its US pulse; (b) the ULB receiving apparatus receives a mixed pulse; and (c) the receiving order of the US pulses by the ULB receiving apparatus is inconsistent with the transmitting order of them, that is, the arriving of the US pulses is in disorder. In the three cases, the ULB receiving apparatus can not judge which US transmitter each of the received US pulses is from so that the ULB receiving apparatus can not use it to calculate the distances to the US transmitters, causing it impossible to calculate location of the ULB receiving apparatus itself.

Nevertheless, by carefully choosing the transmission time interval $T_{interval}$, we can avoid such erroneous cases. Considering that the US signal's propagation attenuation in air is high such that its propagation period is short, the transmission time interval $T_{interval}$ may be selected to be longer than the elapsing period of the US signal in air (i.e., a period during which a US signal, from it is transmitted, vanishes completely). In practice, the US signal will elapse after around 30 ms, so the transmission time interval $T_{interval}$ may be selected between [30, 40]ms. In other words, it should be guaranteed that the next US transmitter can not start to emit its US signals until the US signal from the preceding US transmitter vanishes. As shown in FIG. 6, US transmitter 2 does not emit its US signal until the US signal transmitted by US transmitter 1 is received by the ULB receiving apparatus and vanishes completely.

It will be appreciated by those skilled in the art that the transmission time interval of the structural US transmitter may be changed depending upon transmission power of the US transmitters.

<Detailed Configuration of the ULB Receiving Apparatus>

Below, detailed description will be given to configuration of a receiving apparatus that receives a location beacon containing a first-signal and a second-signal to allow position calculation of an object, in accordance with the present invention. As described above, the first-signal is for example a RF signal, a microwave signal, an infrared signal or the like; and the second-signal is for example a sound wave signal, an infrasonic signal or a mechanical wave that travels more slowly than a electromagnetic wave.

Figure 7:
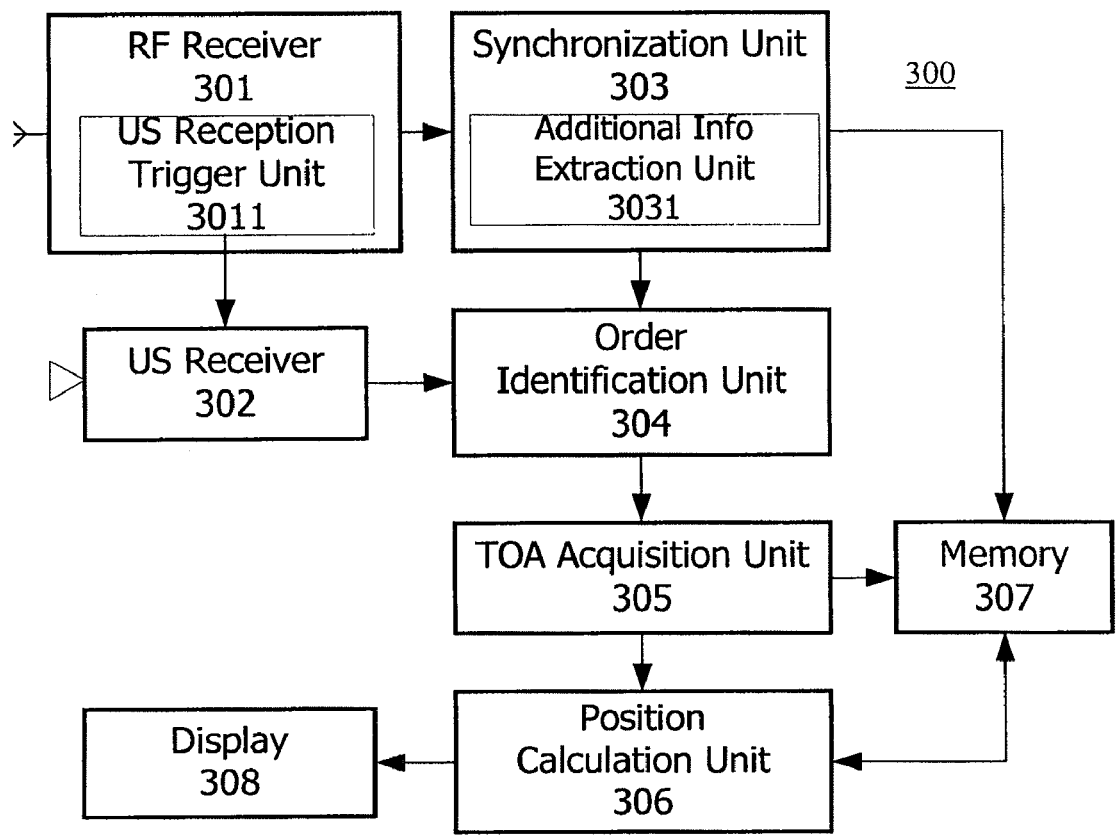
FIG. 7 is a block diagram illustrating configuration of an ULB receiving apparatus in accordance with an embodiment of the present invention.

Description will now be given to detailed configuration of a ULB receiving apparatus 300 according to an embodiment of the present invention, by taking such a location beacon including the RF signal and the US signals as an example. As shown in FIG. 7, ULB receiving apparatus 300 according to the embodiment comprises a RF receiving unit 301, a US receiving unit 302, a synchronization unit 303, an order identification unit 304, a TOA acquisition unit 305, a position calculation unit 306, a memory unit 307 and a display 308.

Upon start-up of the ULB receiving apparatus 300, the RF receiving unit 301 receives a RF signal containing synchronization information transmitted from a ULB transmitting apparatus, and sends the same to the synchronization unit 303. The RF receiving unit 301 of the embodiment may include a US reception trigger unit 3011 for generating a US reception trigger signal and sending the same to the US receiving unit 302 upon detection of the synchronization information.

Upon reception of the US reception trigger signal sent from the US reception trigger unit 3011, US receiving unit 302 starts to detect US signals and sequentially sends the detected US signals to the order identification unit 304.

Based on the synchronization information included in the RF signal received from the RF receiving unit 301, the synchronization unit 303 synchronizes with the ULB transmitting apparatus and obtains a synchronization timing $T_0$ which may be stored in the memory unit 307. It should be understood that the synchronization may be performed by using any know synchronization technologies, e.g. setting a synchronization byte in a RF packet. In the case where the RF signal transmitted from the ULB transmitting apparatus includes the above-described additional information, the synchronization unit 303 of the embodiment may includes an additional information extracting unit 3031 for extracting the additional information from the received RF signal, except the synchronization information. The additional information extracting unit 3031 may store the extracted additional information in the memory unit 307. In an alternative embodiment, the additional information may be previously stored in the memory unit 307 instead of being received from the ULB transmitting apparatus.

The order identification unit 304 sequentially receives US signals sent from the US receiving unit 302, acquires reception timing of each US signal, and determines transmission order of the received US signals based on the reception timings and the synchronization timing obtained by the synchronization unit 303. Herein, the transmission order of the received US signals corresponds to the transmitting ordinal numbers of the transmitting sources of the US signals (e.g., the US transmitters included in the above-described ULB transmitting apparatus).

Based on the transmitting ordinal numbers of the US signals determined by the order identification unit 304, the TOA acquisition unit 305 acquires a TOA information sequence and sends the same to the position calculation unit 306, the TOA information sequence including TOA information samples (i.e., time of arrival from each of the transmission sources of the US signals to the ULB receiving apparatus 300) corresponding to each of the US signals. Specifically, the TOA acquisition unit 305 calculates the TOA information samples from the respective reception timings $T_{D,j}$ (j=1, 2, ..., N, where N is the number of the US transmitters included in the ULB transmitting apparatus) of the US signals and their corresponding transmission timings $T_{US,i}$ (i=1, ..., N). The TOA acquisition unit 305 may store the acquired TOA information sequence in the memory unit 307.

When the Nth TOA information $TOA_N$ is received which indicates that the ULB transmitting apparatus completes a polling period, the position calculation unit 306, from all TOA information samples acquired by the TOA acquisition unit 305 in a polling period and positions of the respective US transmitters corresponding to the respective TOA information samples, calculates the location of the ULB receiving apparatus 300. Specifically, the position calculation unit 306 obtains distances from the respective US transmitters to the ULB receiving apparatus 300 by multiplying the respective TOA information samples in a TOA information sequence by the speed of ultrasonic, and then calculates the location of the ULB receiving apparatus 300 based on values of the distances and positions of the respective US transmitters by triangulation or multilateration. The position calculation unit 306 may provide the calculated location information of the receiving apparatus to the memory unit 307 for store.

In an example, the position calculation unit 306 may perform position calculation by utilizing position information directly indicating positions of the respective US transmitter that is received from the ULB transmitting apparatus or stored locally in advance. In an alternative implementation, the position calculation unit 306 uses structure information of the respective US transmitters that is received from the ULB transmitting apparatus or locally stored in advance to calculate positions of the US transmitters. In the latter case, when the structural US transmitter including the US transmitters has a central-symmetric topology, the position calculation unit 306 automatically sets the coordinates of the central US transmitter to be ($x_1$=0, $y_1$=0, $z_1$=0), then the coordinates of the ith US transmitter may be represented as follows:

$$\begin{cases} x_i = l \cdot \cos\left(\frac{2\pi \cdot (i-1)}{N-1}\right) \\ y_i = l \cdot \sin\left(\frac{2\pi \cdot (i-1)}{N-1}\right) \end{cases} \quad (2)$$

The display 308 presents the position of receiving apparatus calculated by the position calculation unit 306 to the user so as to perform navigation for the user. As used herein, the display 308 may be any display device that may implement display function such as cathode-ray tube (CRT), liquid crystal display screen, plasma display screen, electro luminescence screen and so on.

In an alternative implementation, the ULB receiving apparatus 300 may further comprise a speaker for outputting in voice to a user the position of himself.

<Order Identification Unit>

Figure 8:
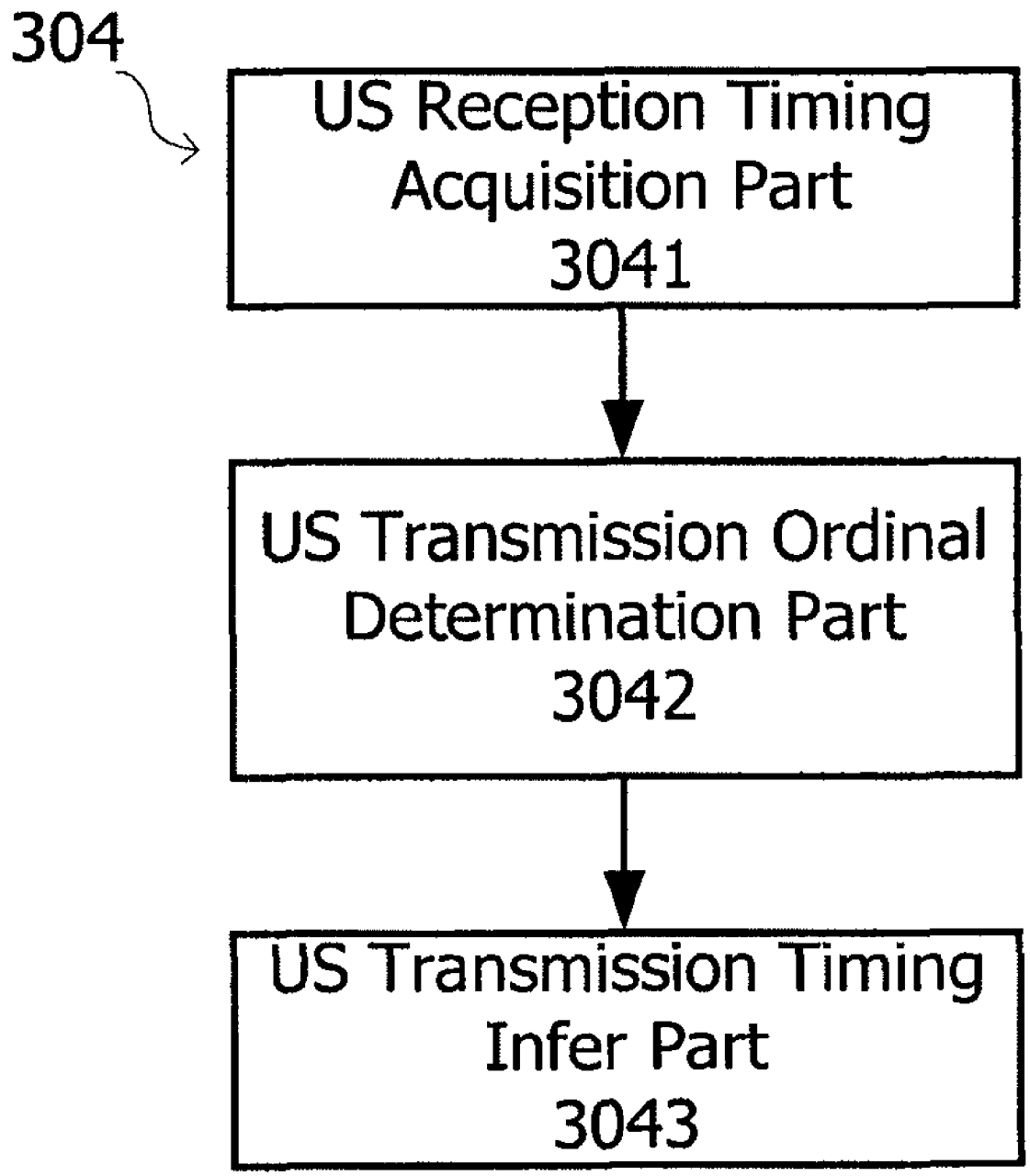
FIG. 8 is a block diagram illustrating detailed configuration of an order identifying unit in the ULB receiving apparatus in accordance with an embodiment of the present invention.

Detailed configuration of the order identification unit 304 according to an embodiment of the present invention will be described with reference to FIG. 8. As shown in FIG. 8, the order identification unit 304 comprises a US reception timing acquisition part 3041, a US transmission ordinal determination part 3042 and a US transmission timing inferring part 3043.

The US reception timing acquisition part 3041 receives US signals sent from the US receiving unit 302 and acquires reception timings $T_{D,j}$ (j=1, 2, ..., N, where N is the number of the US transmitters included in the ULB transmitting apparatus and j denotes a reception ordinal number) at which the respective US signal are received. The US reception timing acquisition part 3041 may store the acquired reception timings $T_{D,j}$ in the memory unit 307 in association with the reception ordinal number j.

The US transmission ordinal determination part 3042 determines transmitting ordinal numbers (herein, referred to as transmitting ordinal numbers of the respective US signal) of the respective US transmitters corresponding to the received US signals, based on the US transmission time interval $T_{interval}$ contained in the above-described additional information. If the reception timing $T_{D,j}$ of the jth received US signal satisfies the following equation:

$$T_0+(i-1)\times T_{interval} \leq T_{D,j} < T_0+i\times T_{interval} \quad (3)$$

where $T_0$ is the synchronization timing obtained by the synchronization unit 303 (see FIG. 7), the US transmission ordinal determination part 3042 determines the transmitting ordinal number of this US signal to be i (i=1, ..., N). By this manner, the reception timing of each received US signal and the transmitting ordinal number of the US transmitter from which the US signal is transmitted are allowed to be associated with each other. The US transmission ordinal determination part 3042 may store the reception timings $T_{D,i}$ (i=1, 2, ..., N, where N is the number of the US transmitters included in the ULB transmitting apparatus and i denotes a transmission ordinal number) of the received US signals in the memory unit 307 in association with the transmission ordinal number i.

The US transmission timing inferring part 3043 infers transmission timings for each of the received US signals based on the transmission ordinal numbers (i.e., transmission ordinal numbers of the corresponding US transmitters) of the respective US signals determined by the US transmission ordinal determination part 3042. Without consideration of the backoff time, the transmission timing of a US signal whose reception timing is $T_{D,i}$ is:

$$T_{US,i}=T_0+(i-1)\times T_{interval} \quad (4)$$

On basis of the above, the TOA acquisition unit 305 (see FIG. 7) may calculate TOA information samples corresponding to the respective received US signals from the reception timings of the US signals acquired by the US reception timing acquisition part 3041 and the transmission timings of the same inferred by the US transmission timing inferring part 3043. Specifically, the arrival of time $TOA_i$ from a US transmitter whose transmission ordinal is ith to the ULB receiving apparatus 300 may be obtained by subtracting transmission timing $T_{US,i}$ of a US signal whose transmission ordinal number is i from its reception timing $T_{D,i}$ by the ULB receiving apparatus 300:

$$TOA_i=T_{D,i}-T_{US,i} \quad (5)$$

In practice, the ULB receiving apparatus 300 may be incapable of detecting all US signals. For example, if a US transmitter whose transmission ordinal is ith is located too far away from the receiver such that the strength of a US signal arriving at the ULB receiving apparatus 300 emitted from the US transmitter is lower than SNR (signal-to-noise ratio) value permitted by the system, the ULB receiving apparatus 300 will fail to detect such US signal. As can be seen from the above, the jth US signal received by the ULB receiving apparatus might not be transmitted by the jth US transmitter, thus it may lead to an erroneous position calculation if a reception ordinal number of a US signal is simply considered as a transmission ordinal number of a US transmitter from which the US signal is transmitted. Fortunately, it is desirably avoided by using the order identification unit 304 in the ULB receiving apparatus 300 of the present invention.

Further, in the ULB receiving apparatus 300, due to software overhead and/or interference from preemptions (such as hardware/software interrupts), although it would be easy for the ULB receiving apparatus 300 and the ULB transmitting apparatus to achieve a byte synchronization, there might be bit offsets. That is to say, the synchronization timing $T_0$ obtained by the ULB receiving apparatus lags than the RF transmission timing of the ULB transmitting apparatus. Herein, we denote an amount of the synchronization delay (bit-synchronization error) as $T_{delay}$. In order to remove the synchronization delay, a bit offset may be measured at the ULB receiving apparatus side and be used to compensate the synchronization delay $T_{delay}$. After compensation, an accurate RF transmission timing $T_0-T_{delay}$ (i.e., corrected synchronization timing) of the ULB transmitting apparatus may be obtained by the ULB receiving apparatus.

Figure 9:
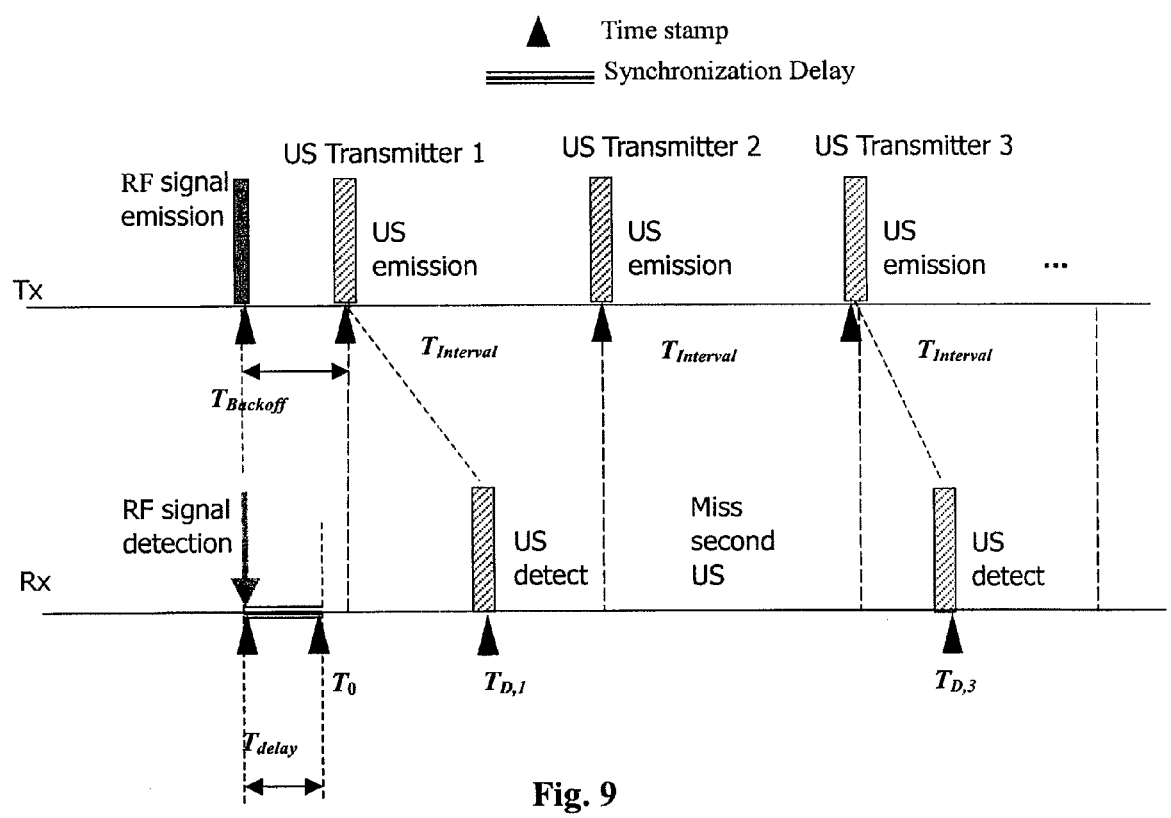
FIG. 9 shows a schematic timeline chart of a ULB receiving apparatus with a backoff time of the ULB transmitting apparatus and a bit-synchronization error of the ULB receiving apparatus taken into account, in accordance with an embodiment of the present invention.

FIG. 9 shows a schematic timeline chart of the ULB receiving apparatus with a backoff time $T_{backoff}$ of the ULB transmitting apparatus and a synchronization delay $T_{delay}$ of the ULB receiving apparatus taken into account, in accordance with an embodiment of the present invention. As shown in FIG. 9, the ULB receiving apparatus achieves synchronization with the ULB transmitting apparatus at a time $T_0$. Upon bit compensation, the ULB receiving apparatus may obtain the corrected RF transmission timing $T_0-T_{delay}$ and add it to the backoff time to infer the transmission timing of the first US signal (the US signal emitted by US transmitter 1 in this example) as $T_0-T_{delay}+T_{backoff}$. Then the transmission timings of US transmitter 2, US transmitter 3, ..., US transmitter n may be inferred as $T_0-T_{delay}+T_{backoff}+T_{interval}$, $T_0-T_{delay}+T_{backoff}+2T_{interval}$, ... $T_0-T_{delay}+T_{backoff}+(n-1)T_{interval}$. In the illustrated instance, the ULB receiving apparatus receives the first US signal at $T_{D,1}$ which is determined to be in [$T_0-T_{delay}+T_{backoff}$, $T_0-T_{delay}+T_{backoff}+T_{interval}$), thus it may be determined that the first US signal is transmitted by the first US transmitter (US transmitter 1) and $T_{D,1}$ is recorded. After that, the ULB receiving apparatus receives the second US signal at $T_{D,2}$ which is determined to be in [$T_0-T_{delay}+T_{backoff}+2T_{interval}$, $T_0-T_{delay}+T_{backoff}+3T_{interval}$) as shown in the figure, so it may be determined that the second US signal is transmitted by the third US transmitter (US transmitter 3) and $T_{D,3}$ is recorded. By this manner, it may be determined from which US transmitter the respective one of the US signals received by the ULB receiving apparatus are transmitted. Subsequently, the obtained transmission timings of the respective US transmitters and the reception timings of the received US signals may be substituted into the equation (5) to calculate the TOA information sequence. As described above, the transmission time interval $T_{interval}$ of the structural US transmitter should be long enough to guarantee vanishment of the US signal in this time interval.

<Consecutive Triangulation Position Calculation Unit>

The position calculation unit 306 in the ULB receiving apparatus 300 of the above embodiment calculates position of the ULB receiving apparatus 300 based on all TOA information samples in a polling period by triangulation or multilateration. In this case, the location of the ULB receiving apparatus 300 is upgraded once every polling period. However, when an object with the ULB receiving apparatus 300 carried on it is moving, the TOA samples obtained by the ULB receiving apparatus 300 will be definitely not from one location. Thus it will give an error position result if these TOA samples from different locations are used to calculate the position of the ULB receiving apparatus 300.

Figure 10:
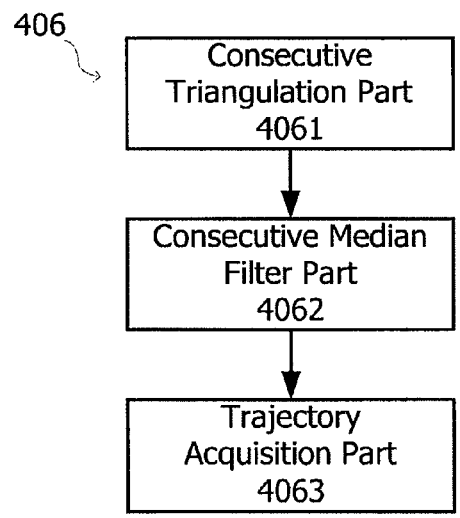
FIG. 10 is a block diagram illustrating a detailed configuration of a consecutive triangulation position calculation unit in an ULB receiving apparatus in accordance with an embodiment of the present invention.

For the above reasons, instead of the position calculation unit 306, a consecutive triangulation position calculation unit may be used according to an embodiment of the present invention. Below, configuration of the consecutive triangulation position calculation unit will be described with reference to FIG. 10. FIG. 10 is a block diagram illustrating detailed configuration of the consecutive triangulation position calculation unit 406 according to the embodiment.

As shown in FIG. 10, the consecutive triangulation position calculation unit 406 comprises a consecutive triangulation part 4061, a consecutive median filter part 4062 and a trajectory acquisition part 4063.

Figure 11:
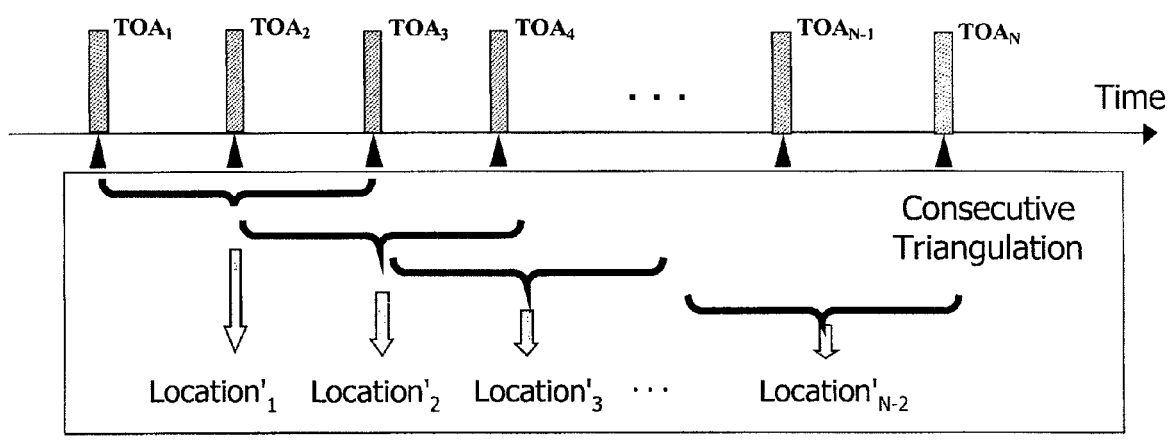
FIG. 11 is a schematic diagram illustrating functional principles of a consecutive triangulation part according to the present invention.

The consecutive triangulation part 4061 applies a three-length sliding window along the TOA information sequence obtained by the TOA acquisition unit 305 (see FIG. 7). Specifically, as shown in FIG. 11, the consecutive triangulation part 4061 uses three temporal-neighboring TOA information samples for triangulation, instead of all TOA samples in a polling period in the above TOA acquisition unit 305. A sequence of initial location samples Location'$_1$, Location'$_2$, . . . , Location'$_{N-2}$ may be obtained by the consecutive triangulation part 4061.

The consecutive median filter part 4062 is used to remove any outlier from the initial location sample sequence obtained by the consecutive triangulation part 4061 to get real-time position of the ULB receiving apparatus in the polling period:

$$Location_I = Median(Location'_I) \quad (6)$$

Where I=1, 2, . . . , N−2, i=1, 2, . . . , n, and n≦N−2.

The trajectory acquisition part 4063 may acquire a real-time moving trajectory of the ULB receiving apparatus based on the real-time location samples from the consecutive median filter part 4062. Consequently, the real-time moving trajectory of a user himself may be presented to the user on a display.

<Sequential Transmission of Location Beacon>

Figure 12:
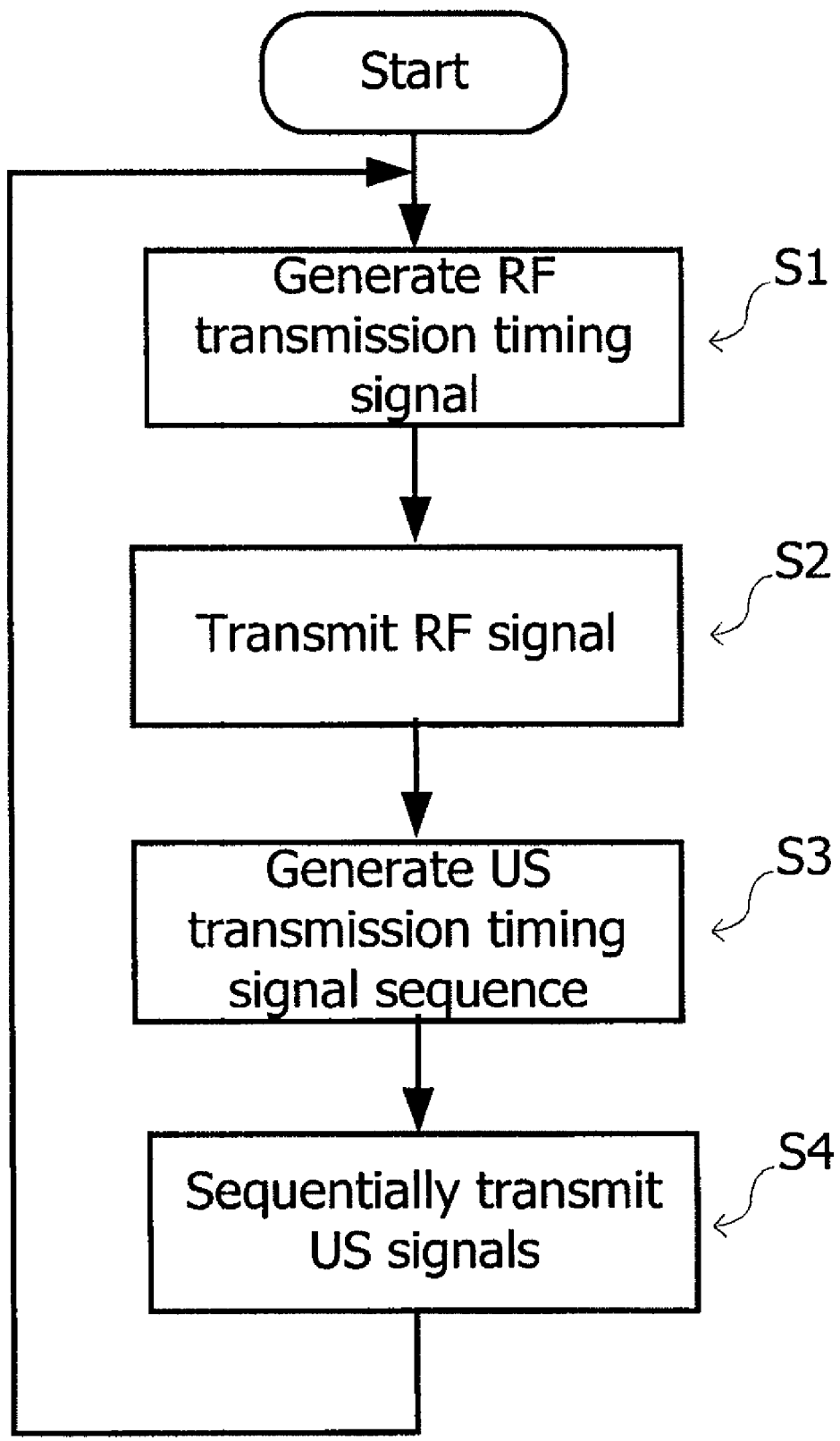
FIG. 12 is a flow chart showing ULB sequential transmission process according to an embodiment of the present invention.

Hereinafter, description will be given to a process of sequentially transmitting location beacons by taking such a location beacon containing a RF signal and US signals as an example, according to an embodiment of the present invention. FIG. 12 is a flow chart showing a ULB sequential transmission process according to the embodiment. By way of example, description will be given in connection with the ULB transmitting apparatus 100 in FIG. 3.

As shown in FIG. 12, firstly the timing generation means 1031 generates RF transmission timing signals for example at a predetermined period, and outputs the generated RF transmission timing signals to the US transmission controlling means 1032 and the RF transmitter 101 (step S1). The RF transmission timing signals define a RF transmission period (also referred to as a polling period) of the RF transmitter 101.

Upon reception of a RF transmission timing signal, the RF transmitter 101 transmits a RF signal containing synchronization information (step S2). In an example, the RF transmitter 101 may also transmit as desired the following additional information: transmitter-position determination information for the structural US transmitter 102, information on transmission time interval of the US transmitters, and/or a backoff time. Depending upon various application scenarios, the transmitter-position determination information may be structural information of the US transmitters or position information directly indicating location of each US transmitter by coordinates or the like. The structural information of the US transmitters is for example a number of the US transmitters, distances between the US transmitters, topology of the structural US transmitter, etc.

At the same time, the US transmission controlling means 1032 generates a US transmission timing signal sequence for controlling the s respective US transmitters in the structural US transmitter 102 to sequentially transmit US signals at a predetermined time interval, and sends the same to the structural US transmitter 102 (step S3). Depending upon transmission power of the US transmitters, the predetermined time interval (i.e., US transmission time interval $T_{interval}$) should be selected to be longer than the elapsing period of the US signal in air, that is to say, a US signal transmitted by a US transmitter will completely vanish in such a time interval. Further, considering the backoff time of the ULB transmitting apparatus, the RF transmission period comes to: RF transmission period=(number of the US transmitters in the ULB transmitting apparatus 100−1)*US transmission time interval $T_{interval}$+backoff time $T_{backoff}$.

Next, the US transmitters 102_1-102_n included in the structural US transmitter sequentially transmit US signals at the predetermined interval based on the US transmission timing signal sequence sent from the US transmission controlling means 1032 (step S4). After a polling period of US signal transmission, the process returns to the step S1 which along with the subsequent steps would be repeated. By this manner, the ULB transmitting apparatus 100 sequentially transmits a RF signal containing synchronization information and a US signal sequence. In an alternative implementation, the location beacon transmission process ends after a polling period without circularly transmitting location beacons.

Figure 13:
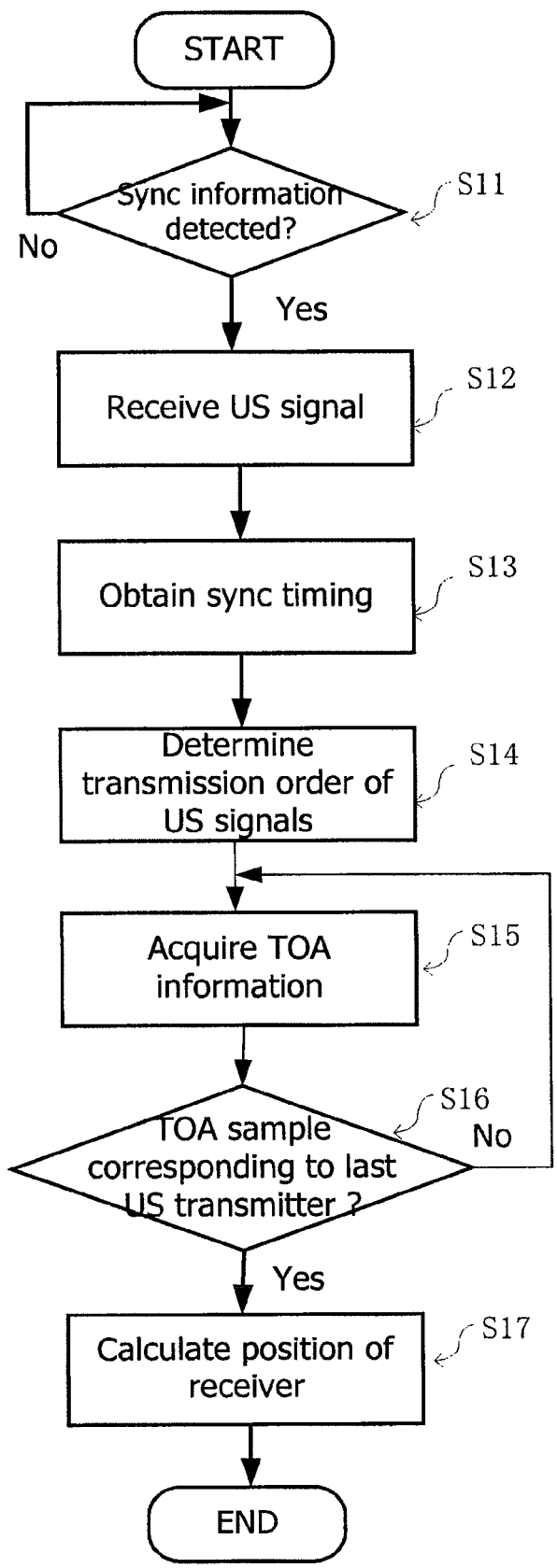
FIG. 13 is a flow chart showing ULB receiving process according to an embodiment of the present invention.

Hereinafter, with reference to FIG. 13, description will be given to a ULB receiving process by taking a location beacon containing a RF signal and US signals as an example, according to an embodiment of the present invention. FIG. 13 is a flow chart showing a ULB receiving process according to the embodiment. By way of example, the description will be given in connection with the ULB receiving apparatus 300 in FIG. 7.

As shown in FIG. 13, upon start-up of the ULB receiving apparatus 300, the RF receiving unit 301 receives a RF signal containing synchronization information transmitted from a ULB transmitting apparatus (step S11). If synchronization information is detected, the RF receiving unit 301 generates a US reception trigger signal and sends the same to the US receiving unit 302, and then the process proceeds to step S12. Otherwise, the process continues detecting in the step S11.

In an example, at step S11, the RF receiving unit further receives a RF signal containing the above-described additional information and sends the same to the synchronization unit 303.

At step S12, upon reception of the US reception trigger signal from the RF receiving unit 301, the US receiving unit 302 begins to receive US signals and send the received US signals to the order identification unit 304. Then, the process proceeds to step S13.

At step S13, based on the synchronization information included in the RF signal received from the RF receiving unit 301, the synchronization unit 303 synchronizes with the ULB transmitting apparatus and obtains a synchronization timing $T_0$. The synchronization timing $T_0$ represents the RF transmission timing of the ULB transmitting apparatus, namely, the timing at which the ULB transmitting apparatus transmits the first US signal without considering the backoff time $T_{backoff}$. In the case where the RF receiving unit 301 further receives a RF signal containing the above-described additional information, the synchronization unit 303 may extract the additional information from the RF signal at step S13, then the process proceeds to step S14.

At step S14, the order identification unit 304 sequentially receives US signals sent from the US receiving unit 302, acquires reception timing of each US signal, and determines transmission order of the received US signals based on the reception timings and the synchronization timing obtained by the synchronization unit 303. Then the process proceeds to step S15.

At step S15, based on the transmitting ordinal numbers of the US signals determined by the order identification unit 304, the TOA acquisition unit 305 acquires a TOA information sequence and sends the same to the position calculation unit 306. Specifically, the TOA acquisition unit 305 calculates the TOA information samples from the reception timings of the respective US signals and their corresponding transmission timings. Then, the process proceeds to step S16.

At step S16, the position calculation unit 306 determines whether the TOA information sample that corresponds to the last US transmitter (the US transmitter having a transmission ordinal number of n, in the case where there are n US transmitters in the ULB transmitting apparatus) is received. If the result is negative, the process returns to step S15 to continue acquisition of TOA information. Contrarily, if the result is affirmative, it indicates that the ULB transmitting apparatus has completed a polling period of transmission, then the process proceeds to step S17.

At step S17, the position calculation unit 306, from the TOA information sequence in the polling period and positions of the respective US transmitters corresponding to the respective TOA information samples included in the TOA information sequence, calculates the position of the ULB receiving apparatus 300. Herein, the position calculation unit 306 may perform position calculation by triangulation or multilaternation. In an example, the position calculation unit 306 may perform position calculation by utilizing position information directly indicating positions of the respective US transmitter that is received from the ULB transmitting apparatus or stored locally in advance. In an alternative implementation, the position calculation unit 306 uses structure information of the respective US transmitters that is received from the ULB transmitting apparatus or locally stored in advance to calculate positions of the US transmitters.

Figure 14:
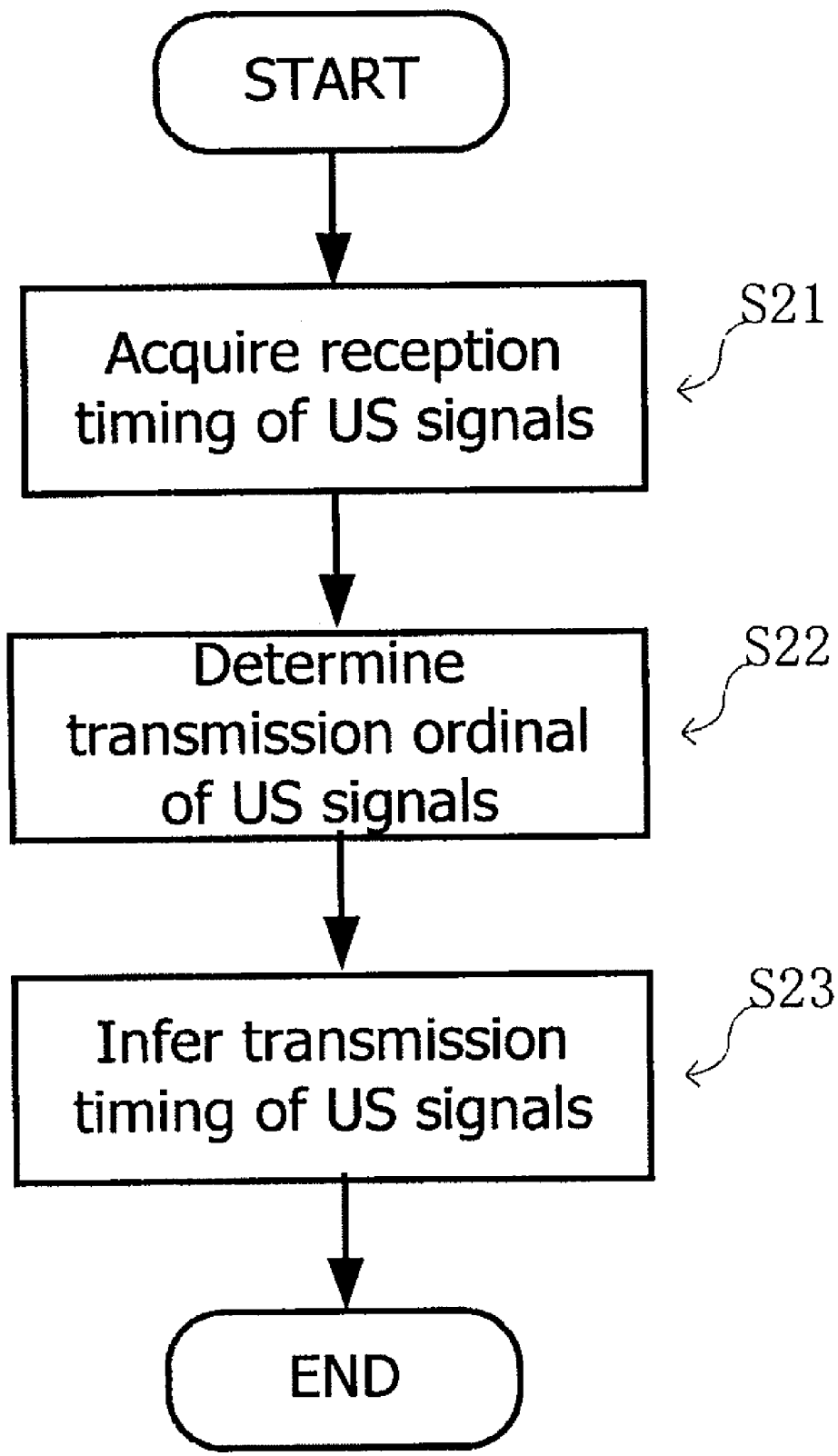
FIG. 14 is a flow chart showing a process for identifying US pulses transmission order according to an embodiment of the present invention.

Hereinafter, a process for identifying US signal transmission order will be described in detail with reference to FIG. 14, according to an embodiment of the present invention. FIG. 14 is a flow chart showing a process for identifying US pulse transmission order according to the embodiment. By way of example, the description will be given in connection with the order identification unit 304 in FIG. 8.

As shown in the figure, at step S21, The US reception timing acquisition part 3041 sequentially receives US signals sent from the US receiving unit 302 and acquires reception timings $T_{D,j}$ (j=1, 2, ..., N, where N is the number of the US transmitters included in the ULB transmitting apparatus) of the respective US signals.

Next, at step S22, based on the US transmission time interval $T_{interval}$ contained in the above-described additional information, the US transmission ordinal determination part 3042 determines from which US transmitter the respective one of the received US signals is transmitted, namely, determining the transmission ordinal numbers of the respective US signals. Specifically, a time period that begins from the transmission timing of the first US transmitter may be divided into several intervals. For example, without considering the backoff time and the bit-synchronization error, the ith interval (i=1, 2, ..., N) denotes an interval of $[T_0+(i-1)\times T_{interval}, T_0+i\times T_{interval})$. If the reception timing $T_{D,j}$ of the jth US signal received falls in the ith interval (i.e., the above equation (3) is satisfied), it indicates that the transmission ordinal number of the US signal is i. By this manner, the reception timing of each received US signal and the transmitting ordinal number of the US transmitter from which the US signal is transmitted are allowed to be associated with each other. Then, the process proceeds to step S23.

At step S23, the US transmission timing inferring part 3043 infers transmission timings for each of the received US signals based on the transmission ordinal numbers of the respective US signals determined in step S22. In the above example, a US signal whose reception timing is $T_{D,i}$ (i.e., reception timing of a received US signal whose transmission ordinal number is i) has a transmission timing of $T_{US,i}=T_0+(i-1)\times T_{interval}$. Then, the process for identifying US signal transmission order ends.

If the backoff time $T_{backoff}$ of the ULB transmitting apparatus and the bit-synchronization error (bit offset) $T_{delay}$ of the ULB receiving apparatus are taken into consideration, the synchronization timing $T_0$ obtained in step S13 cannot be used to represent the RF transmission timing and the transmission timing of the first US signal. At this time, the RF transmission timing may be inferred as $T_0-T_{delay}$, and the transmission timing of the first US signal as $T_0-T_{delay}+T_{backoff}$. In this case, in the above process for identifying the transmission order, the interval used for transmission ordinal number determination should be represented as $[T_0-T_{delay}+T_{backoff}+(i-1)*T_{interval}, T_0-T_{delay}+T_{backoff}+i*T_{interval})$. And for a US signal whose reception timing is $T_{D,i}$, its transmission timing is changed to $T_{US,i}=T_0-T_{delay}+T_{backoff}+(i-1)*T_{interval}$.

Figure 15:
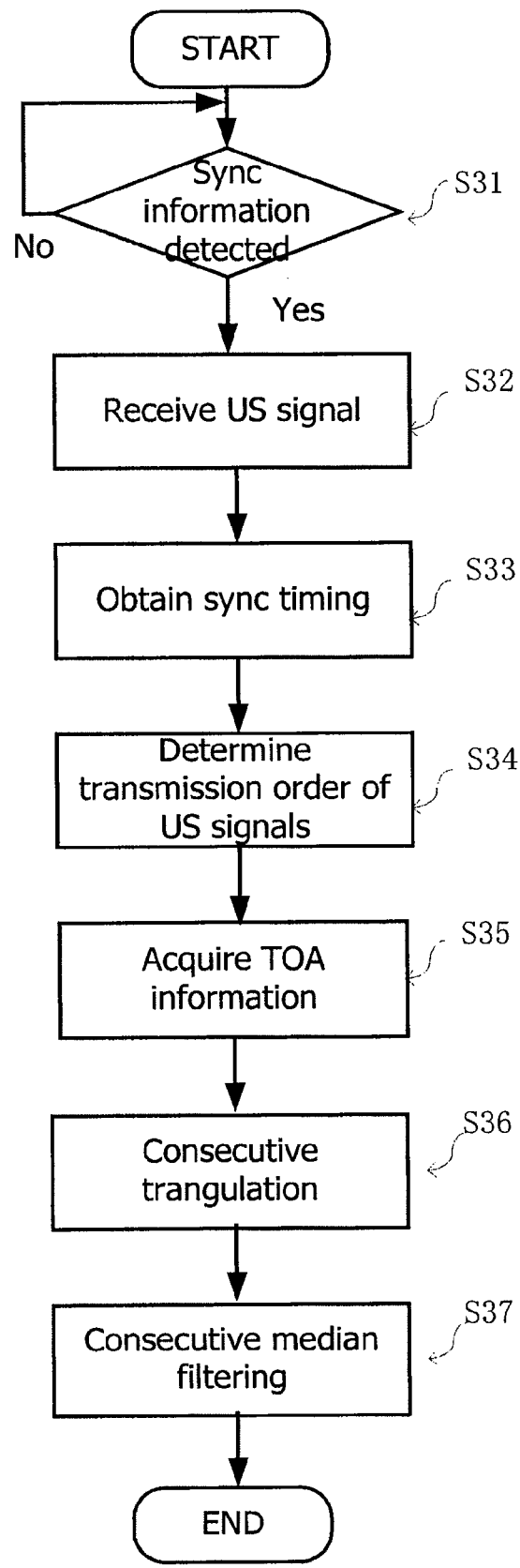
FIG. 15 is a flow chart showing a ULB receiving process according to another embodiment of the present invention.

As described above, when an object with the ULB receiving apparatus carried on it is moving, it will give an error location result if a receiver position is calculated simply by triangulation or multilaternation. Fortunately, it could be avoided by using a method for consecutive triangulation position calculation according to the present invention. FIG. 15 is a flow chart showing ULB receiving process according to another embodiment of the present invention. The process of steps S31-S35 in FIG. 15 is the same as the steps S11-S15 in FIG. 13, and the repeated description will be omitted.

At step S36, the consecutive triangulation part 4061 (see FIG. 10) sequentially receives a TOA information sequence sent from the TOA acquisition unit 305, and applies a three-length sliding window along the TOA information sequence to use three temporal-neighboring TOA information samples for triangulation, and then a sequence of initial location samples are obtained.

Subsequently, at step S37, the consecutive median filter part 4062 is used to remove any outlier from the initial location sample sequence obtained at step S36 to get real-time locations of the ULB receiving apparatus.

Multiple real-time positions of an object may be obtained in a polling period by the ULB receiving process of the embodiment, leading to a better localization accuracy. In one embodiment, a real-time moving trajectory of an object may be acquired based on the obtained real-time locations of the object. Whereby the real-time moving trajectory of a user himself may be presented on a display.

The ULB receiving process of the embodiment may further comprise a display step for displaying a position or a real-time moving trajectory of an object on a display. Alternatively, the ULB receiving process of the embodiment may comprise a step of outputting in voice the position of the object.

Through the above process, the ULB receiving apparatus, if not shut-down, may continue obtaining its own real-time position so as to perform navigation.

<Expansion and Modification>

Although the present invention has been described with respect to embodiments thereof, it will be understood by those skilled in the art that they are intended to be illustrative rather than limitative. While the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. The invention will include any and all embodiments and equivalents falling within the scope of the appended claims.

In the above embodiments, the ULB transmitting apparatus includes a separate transmission timing controller for controlling transmission timings of the RF transmitter and the structural US transmitter, however, the transmission timing controller may be partly or fully incorporated into the RF transmitter.

Additionally, in the above embodiments, the transmission timing controller generates a US transmission timing sequence and sequentially transmits the US transmission timing signals to the respective US transmitters. However, the transmission timing controller also may transmit a RF transmission timing signal to all of the US transmitters, and then based on the RF transmission timing signal, the respective US transmitters transmit US signals after respective periods. Actually, it may be performed in any manner insofar as the US transmitters in the structural US transmitter may sequentially transmit US signals at a predetermined interval.

Further, for simplification of the description, the RF transmitter and the first US transmitter are separately configured in the above embodiments. However, these two devices may be integrated in a single device.

Further, in the above embodiments, the RF receiving unit includes a US reception trigger unit for triggering reception operation of the US receiving unit. However, the US reception trigger unit may not be provided. The order identification unit may employ only the US signals that are received after synchronization, discarding the US signals received before RF synchronization.

Further, the structural US transmitter has a uniform transmission time interval. However, depending upon different applications, varied transmission time intervals may be set as desired.

Further, to simply the description, the ULB receiving apparatus of the above embodiments includes a memory unit configured separately with other components, however, a memory unit may be provided in each of the components as required. As used herein, the memory unit may be, by way of example only but not by limitation, an electronic, magnetic, optical, electromagnetic, infrared, or semiconductor store device, apparatus, system, propagation medium, or computer memory.

Steps can be performed by hardware or software, as desired. Note that steps can be added to, taken from or modified from the steps in the flowcharts presented in this specification without deviating from the scope of the invention. Moreover, various process disclosed in the specification is not limited to those performed chronologically based on the description. Instead, they could be performed in parallel or individually as desired or in light of the processing capability of the device that implements the process. In general, the flowcharts are only used to indicate one possible sequence of basic operations to achieve a function.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated.

What is claimed is:

1. A location-beacon receiving apparatus for receiving a location-beacon from a transmitting apparatus, comprising
a first-signal receiver for receiving a first-signal containing synchronization information;
a second-signal receiver for sequentially receiving second-signals;
a synchronizing unit configured to synchronize with the transmitting apparatus utilizing the synchronization information contained in the first-signal and obtaining a synchronization timing;
an order identification unit configured to indentify a transmission order for the respective second-signals received by the second-signal receiver based on the synchronization timing;
a TOA acquisition unit configured to acquire a TOA information sequence corresponding to the respective second-signals based on the transmission order of the respective second-signals identified by the order identification unit; and
a position calculation unit configured to calculate the position of the receiving apparatus based on the positions of the transmitting sources of the respective second-signals received by the second-signal receiver and the TOA information sequence acquired by the TOA acquiring unit.

2. The receiving apparatus according to claim 1, wherein the first-signal is a radio-frequency signal, a microwave signal or an infrared signal, and the second-signal is an ultrasonic signal.

3. The receiving apparatus according to claim 1, wherein the first-signal receiver further receives part or all of a transmitting-source position determination information for the transmitting sources of the respective second-signals, a transmission time-interval information of the second-signal transmitting sources, and a backoff time which is a time delay between a transmission timing of the first transmitting source and a transmission timing of the first-signal containing the synchronization information.

4. The receiving apparatus according to claim 3, wherein the transmitting-source position determination information is a structure information of the transmitting sources of the respective second-signals or a position information of the transmitting sources of the respective second-signals, and the position calculation unit determines the positions of the transmitting sources of the respective second-signals based on the structure information or the position information.

5. The receiving apparatus according to claim 4, wherein the order identification unit comprises
a transmission ordinal number determination part which divides a time period that begins from the transmission timing of the first second-signal transmitting source into n intervals at the transmission time-interval and determines that the transmission ordinal number of a received second-signal is i if the reception timing of the second-signal is in the ith interval, where n is the number of the second-signal transmitting sources and i=1, 2, . . . , n; and
a second-signal transmission timing inferring part for inferring a transmission timing for each of the received second-signals based on the transmission ordinal numbers determined by the transmission ordinal number determination part.

6. The receiving apparatus according to claim 5, wherein the TOA acquisition unit calculates the TOA information sequence corresponding to the respective second-signals by subtracting the transmission timings of the respective received second-signal from the reception timings of the respective second-signals.

7. The receiving apparatus according to claim 5, wherein the transmission timing of the first second-signal transmitting source is the synchronization timing or a timing that is obtained by adding the backoff time to the synchronization timing.

8. The receiving apparatus according to claim 7, wherein the synchronization unit comprises a bit-synchronization part for compensating a bit-synchronization error by using a bit-synchronization technique and obtaining a corrected-synchronization timing through subtracting the bit-synchronization error from the synchronization timing.

9. The receiving apparatus according to claim 1, further comprising a memory which stores in advance part or all of a transmitting-source position determination information for the transmitting sources of the respective second-signals, a transmission time-interval information of the second-signal transmitting sources, and a backoff time which is a time delay between a transmission timing of the first transmitting source and a transmission timing of the first-signal containing the synchronization information.

10. The receiving apparatus according to claim 9, wherein the transmitting-source position determination information is a structure information of the transmitting sources of the respective second-signals or a position information of the transmitting sources of the respective second-signals, and the position calculation unit determines the positions of the transmitting sources of the respective second-signals based on the structure information or the position information.

11. The receiving apparatus according to claim 1, a time period from when the first-signal receiver receives the first first-signal to when the first-signal receiver receives the second first-signal is an emission period, wherein the position calculation unit comprises
a consecutive triangulation part for applying a three-length sliding window along the TOA information sequence acquired by the TOA acquisition unit and calculating in real time the position of the receiving apparatus based on three temporal-neighboring TOA information samples in an emission period and the positions of the transmitting sources of the respective second-signals by triangulation, thereby obtaining a series of position information of the receiving apparatus in the emission period; and
a consecutive median filter part for removing any outlier from the series of position information to obtain a plurality of real-time positions of the receiving apparatus in the emission period.

12. The receiving apparatus according to claim 1, wherein the first-signal includes a transmission time-interval information indicating a time interval between a transmission of the second-signals, and the transmission order is determined based on the time interval.

13. A method for receiving a location beacon in a receiving apparatus from a transmitting apparatus, comprising the steps of
receiving a first-signal containing synchronization information, synchronizing with the transmitting apparatus by utilizing the synchronization information, and obtaining a synchronization timing;
sequentially receiving second-signals;
determining a transmission order for the respective second-signals received based on the synchronization timing;
acquiring a TOA information sequence corresponding to the respective second-signal based on the identified transmission order; and
calculating the position of the receiving apparatus according to the positions of the transmitting sources of the respective second-signals and the acquired TOA information sequence.

14. The method according to claim 13, wherein the first-signal is a radio-frequency signal, a microwave signal or an infrared signal, and the second-signal is an ultrasonic signal.

15. The method according to claim 13 further comprising a step of
receiving or locally storing in advance part or all of a transmitting-source position determination information for the transmitting sources of the respective second-signal, a transmission time-interval information of the second-signal transmitting sources, and a backoff time that is a time delay between a transmission timing of the first transmitting source and a transmission timing of the first-signal.

16. The method according to claim 15, wherein the transmitting-source position determination information is a structure information of the transmitting sources of the respective second-signals or a position information of the transmitting sources of the respective second-signals, and in the step of calculating the position of the receiving apparatus, the positions of the transmitting sources of the respective second-signals are determined based on the structure information or the position information.

17. The method according to claim 16, wherein the step of identifying the transmission order for the respective second-signal received comprises
dividing a time period that begins from the transmission timing of the first second-signal transmitting source into n intervals at the transmission time-interval and determining that the transmission ordinal number of a received second-signal is i if the reception timing of this second-signal is in the ith interval, where n is the number of the second-signal transmitting sources and i=1, 2, . . . , n; and
inferring transmission timings for each of the received second-signals based on the transmission ordinal numbers determined in the step of determining the transmission ordinal numbers of the second-signals.

18. The method according to claim 17, wherein
in the step of acquiring the TOA information sequence, the TOA information sequence corresponding to the respective second-signals is calculated by subtracting the transmission timings of the respective received second-signals from the reception timings of the corresponding second-signals.

19. The method according to claim 17, wherein the transmission timing of the first second-signal transmitting source is the synchronization timing or a timing which is obtained by adding the backoff time to the synchronization timing.

20. The method according to claim 19, wherein the step of obtaining the synchronization timing comprises compensating a bit-synchronization error by using a bit-synchronization technique and obtaining a corrected-synchronization timing through subtracting the bit-synchronization error from the synchronization timing.

21. The method according to claim 13, a time period from when the first first-signal is received to when the second first-signal is received is an emission period, wherein the step of calculating the position of the receiving apparatus comprises a step of consecutive triangulation in which a three-length sliding window is applied along the TOA information sequence acquired in the step of acquiring the TOA information sequence, and the position of the receiving apparatus is calculated in real time based on three temporal-neighboring TOA information samples in an emission period and the positions of the transmitting sources of the respective second-signals by triangulation, thereby a series of position information of the receiving apparatus in the emission period is obtained; and a step of consecutive median filtering in which any outlier is removed from the series of position information to obtain a plurality of real-time positions of the receiving apparatus in the emission period.

22. The method of claim 13, wherein the first-signal includes a transmission time-interval information indicating a time interval between a transmission of the second-signals, and the transmission order is determined based on the time interval.

* * * * *